United States Patent
Hanson et al.

(10) Patent No.: US 12,163,071 B2
(45) Date of Patent: Dec. 10, 2024

(54) TIE LAYER CHEMISTRY TO PROMOTE BONDING WITH SILICONE ADHESIVE

(71) Applicant: 3M INNOVATIVE PROPERTIES COMPANY, St. Paul, MN (US)

(72) Inventors: Jennifer N. Hanson, Woodbury, MN (US); Kiu-Yuen Tse, Woosbury, MN (US); Amanda C. Engler, Woodbury, MN (US); Pamela A. Percha, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 428 days.

(21) Appl. No.: 17/438,724

(22) PCT Filed: Mar. 13, 2020

(86) PCT No.: PCT/IB2020/052308
§ 371 (c)(1),
(2) Date: Sep. 13, 2021

(87) PCT Pub. No.: WO2020/188438
PCT Pub. Date: Sep. 24, 2020

(65) Prior Publication Data
US 2022/0127505 A1  Apr. 28, 2022

Related U.S. Application Data

(60) Provisional application No. 62/819,254, filed on Mar. 15, 2019.

(51) Int. Cl.
*C09J 7/50* (2018.01)

(52) U.S. Cl.
CPC ........... *C09J 7/50* (2018.01); *C09J 2453/003* (2013.01); *C09J 2471/00* (2013.01); *C09J 2483/00* (2013.01)

(58) Field of Classification Search
None
See application file for complete search history.

(56) References Cited

U.S. PATENT DOCUMENTS

| 2,532,011 A | 11/1950 | Dahlquist |
| 2,607,711 A | 8/1952 | Hendricks |
| 3,318,852 A | 5/1967 | Dixon |
| 3,502,497 A | 3/1970 | Crocker |
| 3,645,835 A | 2/1972 | Hodgson |

(Continued)

FOREIGN PATENT DOCUMENTS

| EP | 1458833 | 9/2004 |
| EP | 1696973 | 9/2006 |

(Continued)

OTHER PUBLICATIONS

Machine translation of JP-2019-167448 A (Year: 2024).*

(Continued)

*Primary Examiner* — Scott R. Walshon

(57) ABSTRACT

An adhesive article including a tie layer and a silicone adhesive is disclosed. The tie layer includes a segmented copolymer having a first segment that is one of (a) a polyether comprising one of PTMO or PEO/PPO or (b) a polysiloxane. The segmented copolymer has a water absorbency of less than about 13%.

12 Claims, 3 Drawing Sheets

(56) References Cited

U.S. PATENT DOCUMENTS

| | | | |
|---|---|---|---|
| 3,825,379 | A | 7/1974 | Lohkamp |
| 3,849,241 | A | 11/1974 | Butin |
| 4,241,198 | A | 12/1980 | Kobayashi |
| 4,595,001 | A | 6/1986 | Potter |
| 4,728,571 | A | 3/1988 | Clemens |
| 5,032,460 | A | 7/1991 | Kantner |
| 5,088,483 | A | 2/1992 | Heinecke |
| 5,160,315 | A | 11/1992 | Heinecke |
| 5,202,190 | A | 4/1993 | Kantner |
| 5,214,119 | A | 5/1993 | Leihr |
| 5,230,701 | A | 7/1993 | Meyer |
| 5,238,733 | A | 8/1993 | Joseph |
| 5,290,615 | A | 3/1994 | Tushaus |
| 5,356,706 | A | 10/1994 | Shores |
| 5,516,581 | A | 5/1996 | Kreckel |
| 5,601,851 | A | 2/1997 | Terakawa |
| 5,622,711 | A | 4/1997 | Chen |
| 5,633,010 | A | 5/1997 | Chen |
| 5,750,630 | A | 5/1998 | Sengupta |
| 7,915,370 | B2 | 3/2011 | Sherman |
| 8,541,481 | B2 | 9/2013 | Determan |
| 2008/0233348 | A1 | 9/2008 | Ishiwatari |
| 2011/0212325 | A1 | 9/2011 | Determan |
| 2014/0349108 | A1* | 11/2014 | Fung ................... C09J 7/50 428/355 R |
| 2019/0002737 | A1 | 1/2019 | Runge et al. |

FOREIGN PATENT DOCUMENTS

| | | |
|---|---|---|
| EP | 2793960 | 10/2014 |
| EP | 2794799 | 10/2014 |
| JP | 2019167448 A * | 10/2019 |
| WO | WO 1995-006691 | 3/1995 |
| WO | WO 1997-002375 | 1/1997 |
| WO | WO 2005-102403 | 11/2005 |
| WO | WO 2012-091742 | 7/2012 |

OTHER PUBLICATIONS

Wente, "Manufacture of Superfine Organic Fibers", Navel Research Laboratories Report 4364, May 25, 1954, 24 pages.

Wente, "Superfine Thermoplastic Fibers", Industrial Engineering Chemistry, Aug. 1956, vol. 48, No. 8, pp. 1342-1346.

International Search Report for PCT International Application No. PCT/IB2020/052308, mailed on May 29, 2020, 5 pages.

* cited by examiner

TIE LAYER CHEMISTRY TO PROMOTE BONDING WITH SILICONE ADHESIVE

FIELD OF THE INVENTION

The present invention relates generally to the field of adhesive articles. In particular, the present invention is an adhesive article having a silicone adhesive layer.

BACKGROUND

The application of pressure sensitive adhesives (PSAs), including silicone pressure sensitive adhesives, for adhering to skin is known in the art and many examples are commercially available. However, some properties of PSAs limit their application for adhesion to skin. For instance, skin damage may result during the removal of a PSA that exhibits too high a level of adhesion to the skin. Alternatively, if the adhesive strength is reduced, the PSA may lack sufficient holding power to be useful. Another potential failure mechanism of PSAs particularly when incorporated into first aid bandages, is that the adhesion to the skin can be so high, that upon removal, the adhesive is removed from the backing. Additionally, PSAs that are relatively rigid or non-conformable compared to skin could result in consumer discomfort during use and/or could lack sufficient holding power as they cannot conform to skin. Also, even adhesives that have a measured low peel adhesion from skin may cause discomfort during removal, e.g., if the adhesive becomes entangled with hair.

The unique properties of silicone gel adhesives, including their softness, high adhesion to skin, and gentle removal from hair, make these adhesives suitable for gentle to skin applications. Silicone adhesives provide good adhesion, yet remove gently and have the ability to be repositioned once placed on the skin. Certain silicone adhesives are useful for medical tapes and dressings because the silicone adhesive can provide adhesion while gently removing from the skin without causing trauma or stripping skin cells or hair. Some of these silicone adhesives are described in U.S. Pat. App. Pub. No. 2011/0212325 (Determan et al.) and Int. Pat. App. Pub. No. WO 2005/102403 (Gantner et al.).

While silicone adhesive tapes have many desirable properties, in certain silicone adhesive tapes, delamination of the silicone adhesive from the tape backing can be a problem. Such delamination can make it difficult to remove the product from skin without leaving residue, for example. Delamination of the silicone adhesive from the backing is generally caused by a bond failure between either the tape backing and a tie layer, or the tie layer and the silicone adhesive. Failure at either bond can cause a failure to remove the adhesive from skin.

SUMMARY

In one embodiment, the present invention is an adhesive article including a tie layer and a silicone adhesive. The tie layer includes a segmented copolymer having a first segment that is one of (a) a polyether comprising one of PTMO or PEO/PPO or (b) a polysiloxane. The segmented copolymer has a water absorbency of less than about 13%.

In another embodiment, the present invention is an adhesive article including a silicone adhesive and a tie layer. The tie layer includes a segmented copolymer having a $T_{endotherm}-T_g$ of at least about 52° C. and comprises less than about 30% PEO.

While the above-identified drawing and figure sets forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Figure 1:
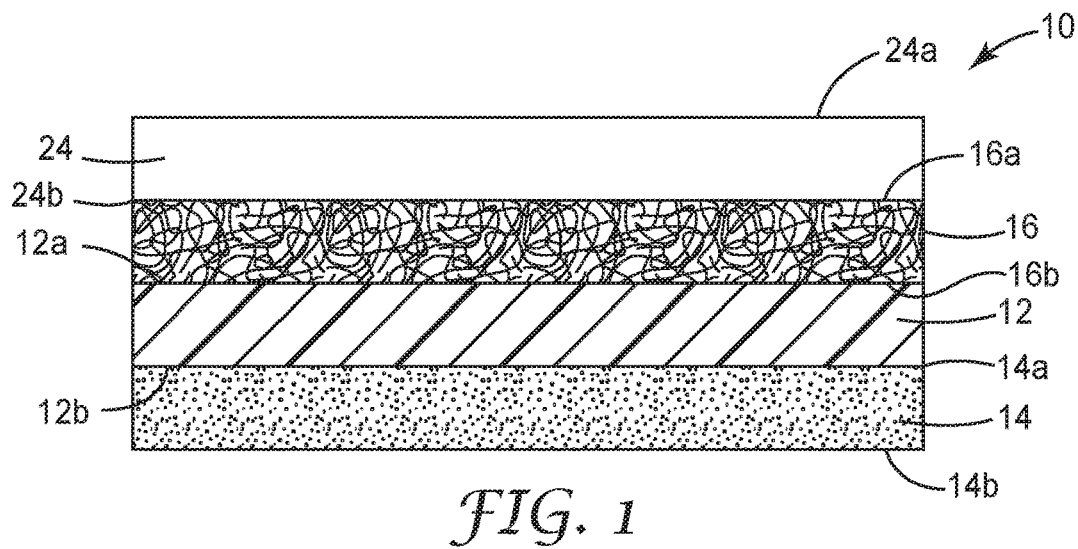
FIG. 1 is a schematic side view of a first embodiment of an adhesive article of the present invention.

FIG. 1 depicts a schematic side view of an adhesive article 10 of the present invention, which has reliable adhesion anchorage when used with a silicone adhesive. The adhesive article 10 generally includes a tie layer 12, a silicone adhesive 14, and an optional backing layer 16. Each of the tie layer 12, silicone adhesive 14, and backing layer 16 has a first major surface and a second major surface 12a and 12b, 14a and 14b, and 16a and 16b, respectively. When a backing layer 16 is included, the tie layer 12 is positioned between the second major surface 16b of the backing layer 16 and the first major surface 14a of the silicone adhesive 14. The adhesive article 10 of the present invention provides a stable construction in which the bond between the tie layer 12 and the silicone adhesive 14 will not fail during normal use.

Figure 2:
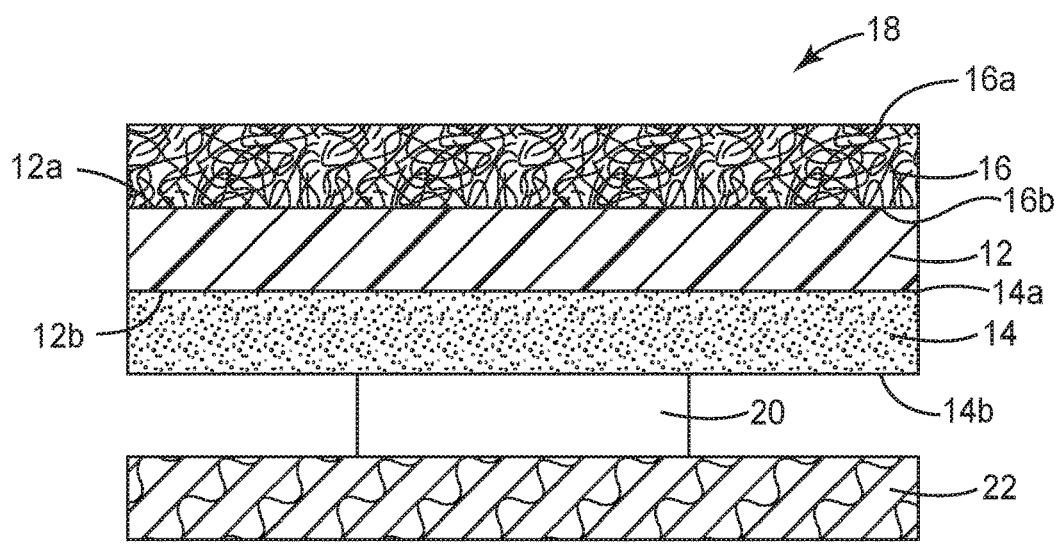
FIG. 2 is a schematic side view of a bandage construction including the adhesive article of the present invention.

In one embodiment, the adhesive article 10 is part of a medical article. Generally, "medical articles" include, but are not limited to: medical tapes, surgical grapes, medical dressings (e.g., intravenous dressings, wound dressings, etc.), electrodes, ostomy pouches, transdermal drug delivery devices (e.g., patches), bandages, and combinations thereof. In particular, the adhesive article can be used as part of a bandage construction 18, as shown in FIG. 2. When used as part of a medical article such as a bandage construction, an absorbent material 20 such as a pad may be positioned adjacent to the second major surface 14b of the silicone adhesive 14, which is then further covered with a releasable liner 22.

Tie Layer

The tie layer 12 includes a segmented copolymer having at least a first segment and a second segment. As used in this application, "segmented copolymers" can include block copolymers. The first segment is composed of either (1) a polyether including one of poly(tetramethylene oxide) (PTMO) or polyethylene oxide (PEO)/polyphenylene oxide (PPO) or (2) a polysiloxane. It is believed that the level of PEO can affect the ability of the tie layer 12 to bond to the silicone adhesive 14 due to swelling/water absorption. Without being bound by theory, it is believed that at high water absorbencies, swelling can occur, causing bond failure between the tie layer 12 and the silicone adhesive 14. Thus, to sufficiently bond to the silicone adhesive 14, the tie layer 12 must have a lower hydrophilicity/water absorbency. In one embodiment, the tie layer 12 has a water absorbency of less than about 13%. Therefore, in tie layers that include PEO, the PEO should not exceed a certain amount. In one embodiment, the tie layer 12 includes less than about 30% PEO, particularly less than about 25% PEO, and more particularly less than about 20% PEO. On the other hand, higher moisture vapor permeability is desired for bandage application, where it allows sweat or moisture to permeate and evaporate. Higher hydrophilicity and water absorbency typically correlate to higher moisture vapor permeability. There is a need to balance these properties in the selection of copolymer for the tie layer 12.

The segmented copolymer also includes a second segment. The second segment can include, but is not limited to: a polyurethane, a polyurea, a polyamide, a polyoxamide, a polyester, and a polycarbonate. Thus, particularly suitable tie layers include, but are not limited to: polyether polyester, polyether polyurethane, polyether polyurea, polyether polyoxamine, polyether polyamide, polyether polycarbonate, silicone polyester, silicone polyurethane, silicone polyurea, silicone polyoxamine, silicone polyamide, and silicone polycarbonate. Specific examples of suitable polyether-based polyurethanes include, but are not limited to: polyurethanes derived from the reaction of poly(tetramethylene oxide) (PTMO) and butane diol (BD) with methylene diphenyl diisocyanate (MDI), or polyurethanes derived from the reaction of PEO/PTMO with 4,4'-methylene dicyclohexyl diisocyanate ($H_{12}$-MDI).

By contrast, it has been found that resins including polyester-based polyurethane resins, adipic acid, or polycaprolactone were ineffective at sufficiently bonding with silicone adhesives.

At room temperature, the tie layer 12 is in a semi-crystalline state. By semi-crystalline, it is meant that the tie layer 12 can show minor melting and crystallization and that the segmented copolymer making up the tie layer 12 is within its crystallization window for the resin. That is, the tie layer 12 is between its glass transition temperature ($T_g$) and its equilibrium melting temperature ($T_m$). The tie layer therefore maintains some crystalline order, i.e., there is higher melting material present despite minor melting. The tie layer 12 also does not show an exotherm at room temperature. Without being bound by theory, it is believed that the tie layer 12 is undergoing one of three mechanisms that allows the tie layer to effectively bond to the silicone adhesive 14: (1) the tie layer 12 is being plasticized or softened by water, (2) low order melting is occurring, or (3) a partial fraction of the tie layer is molten, while also having crystallinity. In order to have enough tack to sufficiently bond to the silicone adhesive, in one embodiment, the tie layer 12 of the preset invention includes a $T_{endotherm}-T_g$ of at least about 52° C., particularly at least about 55° C., and more particularly at least about 60° C. The endotherm temperature is the onset of the first endotherm above the glass transition temperature, where "endotherm" is defined as a transition in which energy is absorbed.

To test the bond strength of the tie layer 12 to the silicone adhesive 14, the adhesive article 10 is adhered to a surface and then removed. The tie layer 12 is considered to provide sufficient bond strength if the silicone adhesive 14 is not removed from the tie layer 12 upon removal of the adhesive article 10 from the surface. In contrast, if the tie layer fails, either by not adhering to the adhesive or because it was not anchored to the backing layer (when present), adhesive residue is left on the surface. In some cases, the adhesive can split cohesively, suggesting the bond to the tie layer was so strong that the strength of the adhesive itself fails before the adhesive is removed from the tie layer. In one embodiment, the adhesive article is laminated to a 3M™ Polyester Tape 8403 with a 2 kg roller at 12 inches per minute and allowed to dwell for about 20 minutes. The 3M™ Polyester Tape 8403 is then removed at about 12 inches per minute at about 180 degrees. In one embodiment, at least 40% by area of the silicone adhesive 14 remains on the backing layer 16 after the adhesive article 10 is removed from the 3M™ Polyester Tape 8403, particularly at least 50% by area of the silicone adhesive 14 remains on the backing layer 16, and more particularly, at least about 60% by area of the silicone adhesive 14 remains on the backing layer 16.

In one embodiment, when the adhesive article 10 is applied onto the 3M™ Polyester Tape 8403 and removed at about 12 inches per minute at about 180 degrees, there is less than about 60% silicone adhesive transfer to the surface (i.e., 40% remains adhered to the backing layer), particularly less than about 50% silicone adhesive transfer to the surface (i.e., 50% remains adhered to the backing layer), more particularly less than about 30% silicone adhesive transfer to the surface (i.e., 70% remains adhered to the backing layer), and even more particularly less than about 20% silicone adhesive transfer to the surface (i.e., 80% remains adhered to the backing layer).

Silicone Adhesive

"Adhesion" or ("adhesion strength") refers to the force required to separate an adhesive from an underlying substrate. Adhesion can be measured in a number of ways. For example, adhesion can be defined by peel force or shear force. In some embodiments, adhesion can be defined by peel adhesion using ASTM D3330/D3330M-04(2010). Adhesion is highly dependent on the specific substrate being adhered to, as well as the time the adhesive (e.g., pressure sensitive adhesive) is allowed to dwell on the substrate. The peel adhesion to biological substrates such as human skin is known to be highly variable. Skin type, location on the body, and other factors can affect results. Generally, average values of peel adhesion from skin are subject to large standard deviations. In some embodiments, the average peel adhesion for human skin may be less than about 300 gram/2.54 cm, particularly less than about 200 gram/2.54 cm, and more particularly, less than about 100 gram/2.54 cm.

Suitable adhesives for use in the present invention include any silicone adhesive that provides acceptable adhesion to skin and is acceptable for use on skin (e.g., the adhesive should preferably be non-irritating and non-sensitizing). One problem with using adhesive articles for medical applications is that the removal of the adhesive article can cause trauma to the skin. This is particularly troublesome in patients with sensitive skin, such as infants and the elderly, and can become severe with chronic patients where adhesive articles are repeatedly attached and removed over a long-term period.

The widespread use of adhesives in medical applications has led to the development of adhesives and adhesive articles that are gentle to the skin and do not strip off skin cells significantly when removed. Generally, silicone adhesives are able to effectively secure dressings and tape to skin and upon removal from the skin, produce little or no skin damage. In one embodiment, the silicone adhesive 14 of the present invention is a pressure sensitive adhesive (PSA) that can adhere the substrate to skin with application of light pressure and without the need for heat or other external sources to active adhesion. In another embodiment, the silicone adhesive is a gel.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers, and silicones.

The application of pressure sensitive adhesives, including silicone pressure sensitive adhesives, for adhering to skin is known in the art and many examples are commercially available. However, some pressure sensitive adhesives have issues that limit their use for adhesion to skin. For instance, skin damage may result during the removal of a pressure sensitive adhesive that exhibits surface adhesion to skin that is too high. Alternatively, if the surface adhesion to skin is reduced, the pressure sensitive adhesive may lack sufficient holding power to be useful. Additionally, some pressure sensitive adhesives that are relatively rigid or non-conformable compared to skin typically result in considerable patient discomfort during use. Also, even adhesives that have a measured low peel adhesion to skin may cause discomfort during removal, e.g., if the adhesive becomes surface attached around hair.

Another class of adhesives used in medical applications are silicone gels. As used herein, the terms "siloxane" and "silicone" are used interchangeably. The term siloxane is replacing silicone in common usage, but both terms are used in the art. Silicone gel (crosslinked poly dimethylsiloxane ("PDMS")) materials have been used for dielectric fillers, vibration dampers, and medical therapies for promoting scar tissue healing. Commercially available silicone gels are soft, tacky, elastic materials that comprise relatively high levels of fluids (liquids). Silicone gels are typically softer than silicone pressure sensitive adhesives, resulting in less discomfort when adhered to and removed from skin. The combination of low skin trauma upon removal and low skin irritation upon wearing, make silicone gels suitable for gentle to skin adhesive applications.

Examples of commercially available silicone gel adhesive systems include products marketed with the trade names: Dow Corning MG 7-9850, WACKER 2130, BLUESTAR 4317 and 4320, and NUSIL 6345 and 6350. These gentle to the skin adhesives are formed by an addition cure reaction between vinyl-terminated PDMS and hydrogen terminated PDMS, in the presence of a hydrosilylation catalyst (e.g., platinum complex). Vinyl-containing and hydrogen-containing PDMS chains are referred to as 'functionalized' silicones due to their specific curable chemical moieties. Individually, such functional silicones are generally not reactive; however, together they form a reactive silicone system. Generally, due to processing requirements such as the need to be solventless, the desired formulation lifetime, and the reaction kinetics of the curing reactions, these reactive siloxane systems typically use functional PDMS fluids with low viscosities and thus low molecular weights. Additionally, silicone resins (tackifiers sometimes referred to as "silicate resins") and PDMS with multiple hydrogen functionalities (crosslinkers) can be formulated to modify the adhesive properties of the gel.

Pressure sensitive adhesives are used in medical applications because they can have good adhesion to a wide variety of substrates (for example, to skin as well as to tubing, drapes, tape backings, and the like). They can, however, on occasion cause skin damage. Gel adhesives, on the other hand, can have desired low skin trauma. They can, however, have low adhesion, both to skin and to other substrates such as tubing, drapes, tape backings, and the like. Thus, the need remains for adhesives suitable for medical uses that have high adhesion to a wide range of substrates without causing skin damage.

As used herein, the term "gel adhesive" refers to a tacky semi-solid crosslinked matrix containing a liquid or a fluid that is capable of adhering to one or more substrates. The gel adhesives may have some properties in common with pressure sensitive adhesives, but they are not pressure sensitive adhesives.

The term "silicone" or "silicone-based" as used herein refers to polymers that contain units with dialkyl or diaryl siloxane ($-SiR_2O-$) repeating units. The silicone-based polymers may be segmented copolymers or polysiloxanes polymers. The terms silicone and siloxane are used interchangeably.

Silicone adhesives useful for practicing the present disclosure may include, but are not limited to, silicone gel adhesives or silicone pressure sensitive adhesives. Some silicone pressure sensitive adhesive compositions useful for practicing the present disclosure are commercially available, for example, from Dow Corning, Midland, MI, under the trade designation "7735" and from Momentive Performance Materials, Columbus, OH, under the trade designation "SIL-GRIP 6574". Suitable silicone adhesives for medical applications include lightly crosslinked silicone gel adhesives that are soft, tacky, elastic materials with moderate adhesive strength. Silicone gel adhesives typically have excellent wetting characteristics due to their inherent low glass transition temperature, low surface energy, and relatively low storage modulus. The inertness and lack of reactivity of the silicone materials make silicone gels suitable for gentle-to-skin adhesive applications. Additionally, the elastic nature of the crosslinked gel and lack of interaction with hair surfaces debond the adhesives from skin by stretch releasing and further reduces the instances of pain during removal. Some silicone adhesives (e.g., silicone gel adhesives) useful for practicing the present disclosure are commercially available, for example, from Dow Corning under the trade designations "MG 7-9850" and "MG 7-1010"; from Wacker Chemie AG, Munich, Germany, under the trade designation "SIL-PURAN 2130"; from Bluestar Silicones, East Brunswick, NJ, under the trade designations "RT GEL 4317 and "SIL-BIONE RT GEL 4320"; and from NuSIL Silicone Technology, Carpinteria, CA, under the trade designations "MED-6345" and "MED-6350".

In some embodiments, silicone adhesives useful for practicing the present disclosure are formed by an addition cure reaction between vinyl-terminated poly(dimethylsiloxane) (PDMS) and hydrogen terminated PDMS, in the presence of a hydrosilation catalyst (e.g., platinum complex). Vinyl-terminated and hydrogen terminated PDMS chains are referred to as 'functionalized' silicones due to their specific chemical moieties. Individually, such functional silicones are generally not reactive; however, together they form a reactive silicone system. Additionally, silicate resin tackifiers, such as those described in further detail below, and PDMS with multiple hydrogen functionalities (crosslinkers) can be formulated to modify the adhesive properties of the silicone adhesives. Silicone adhesives resulting from this addition reaction are typically called silicone gel adhesives if they are very lightly crosslinked polydimethysiloxane (PDMS) networks with some level of free (not crosslinked) PDMS fluid and no or low levels of tackifying resin. By contrast, silicone pressure sensitive adhesives are typically formulated with higher levels of tackifying resins (e.g., 45-60 weight percent). The amount of tackifying resin and control of crosslink density (the chain length of the polymer between the crosslinks) are features that are carefully controlled in silicone adhesives useful for medical articles that will adhere to skin. Silicone adhesives (e.g., silicone gel adhesives) useful for practicing the present disclosure may also include hydroxyl functional groups. Examples of such adhesives are disclosed in Int. Pat. App. Pub. No. WO 2005/102403 (Gantner et al.).

In some embodiments, the silicone adhesive 14 is a radiation crosslinked silicone adhesive, such as those disclosed in U. S. Pat. App. Pub. No. 2011/0212325 (Determan et al.), the disclosure of which is herein incorporated by reference. Radiation crosslinking processes typically require less space and less capital equipment than catalyzed thermal curing processes. Also, radiation crosslinking is typically a faster process than thermal curing, which results in higher throughput and lower manufacturing costs. Radiation curing is typically accomplished through high energy radiation, such as electron beam or gamma ray radiation, as described in U. S. Pat. App. Pub. No. 2011/0212325 (Determan et al.). Reactive functional groups are not required in the adhesive compositions in order to make radiation crosslinked silicone adhesives.

In some embodiments, silicone adhesives useful in the articles and methods of the present disclosure may be prepared by combining one or more poly diorganosiloxane materials (e.g., silicone oils or fluids), optionally with an appropriate tackifying resin, coating the resulting adhesive composition on the substrate or primer, and crosslinking the adhesive composition to form the silicone adhesive. In some embodiments, coating the silicone adhesive composition includes pattern coating. Generally, any known additives useful in the formulation of adhesives may also be included. For example, the adhesive component may contain tackifiers, plasticizers, rheology modifiers as well as active components including for example an antimicrobial agent.

If included, generally, any known tackifying resin may be used. Suitable silicate tackifying resins are commercially available from sources such as Momentive Performance Materials (e.g., under the trade designations "SR545" and "SR1000"), and Wacker Chemie AG (e.g., under the trade designation "MQ 803 TF").

The polysiloxane material, the tackifying resin, if present, and any optional additives (e.g., fillers, pigments, additives for improving adhesion, pharmaceutical agents, cosmetic agents, natural extracts, silicone waxes, and rheology modifiers) may be combined by any of a wide variety of known means prior to being coated and cured. For example, in some embodiments, the various components may be pre-blended using common equipment such as mixers, blenders, mills, and extruders.

In certain embodiments, the silicone adhesive 14 has a relatively high moisture vapor transmission rate to allow for moisture evaporation. For an adhesive in contact with skin, it is desirable that the adhesive is able to transmit moisture vapor at a rate greater to or equal to that of human skin. While such a characteristic can be achieved through the selection of an appropriate adhesive, it is also contemplated that other methods of achieving a high relative rate of moisture vapor transmission may be used, such as perforating the adhesive or pattern coating the adhesive, as described in U.S. Pat. No. 4,595,001 and U.S. Pat. App. Pub. 2008-0233348, the disclosure of which are herein incorporated by reference.

The thickness of the silicone adhesive 14 is not particularly limited. In one embodiment, the thickness will be at least about 10 microns, and in some embodiments, at least about 20 microns. In some embodiments, the thickness will be no greater than about 400 microns, and in some embodiments, no greater than about 200 microns.

Backing Layer

The optional backing layer 16, or substrate, may be any material known to those of skill in the art and can include single-layer and multi-layer constructions. In some embodiments, backing layers of the present disclosure can include medical backings that are particularly suitable for use in medical articles, i.e., having have the proper breathable, optical, and mechanical properties. Generally, the backing layer 16 will be composed of a flexible material to facilitate application of the adhesive article around curves and bends in the body, such as fingers, elbows or knees. In addition, the backing layer 16 may optionally be breathable. The backing layer 16 may also provide an impermeable barrier to the passage of liquids and at least some gases. Examples of suitable backing layers include, but are not limited to: woven and nonwoven fibrous webs, knit, films, fabrics, foams, polymeric films, or a combination thereof. In some embodiments, a transparent substrate is desirable to allow for viewing of the underlying skin or medical device.

Wovens can be made of natural or synthetic fibers, including, but not limited to cotton, nylon, polyester, polyurethanes, polyimides, polyamides, cloth or acrylic-based materials. Examples of a woven backing include, but are not limited to, a polyester (PET)/Spandex woven blend or a polybutylene terephthalate (PBT)/cotton blend. In one embodiment, the woven may be a 70% PET/30% Spandex woven blend. In other embodiments, the woven may be comprised of 95% PET/5% Spandex. In yet another embodiment, the woven can be comprised of 100% PET.

Suitable nonwoven backings can be formed of a variety of materials, including, but not limited to: polyesters, polyurethanes, polyimides, polyamides, polystyrenes, cellulose, polyolefins, glass fibers, ceramic fibers, and combinations thereof. An example of a suitable nonwoven backing layer material is a high strength nonwoven fabric available from Jacob Holm, Basel Switzerland under the trademark Sontara, including Sontara 8010, a hydroengangled polyester fabric. Other suitable nonwoven webs include a hydroentangled polyester fabric available from Veratec, a division of International Paper of Walpole, Mass. Another suitable nonwoven web is the nonwoven elastomeric web described in U.S. Pat. No. 5,230,701, herein incorporated by reference.

Other suitable non-wovens could have fibers entangled with each other in the form of a coherent breathable fibrous nonwoven backing layer. Suitable nonwoven backing layers can be formed as melt blown microfiber webs using the apparatus discussed, for example, in Wente, Van A., "Superfine Thermoplastic Fibers", Industrial Engineering Chemistry, Vol. 48, pages 1342-1346, Wente, Van A. et al., "Manufacture of Superfine Organic Fibers", Report No. 4364 of the Navel Research Laboratories, published May 25, 1954, and in U.S. Pat. Nos. 3,849,241; 3,825,379; and others. Conjugate melt blown fibers can be formed, for example, as a multilayer fiber as described, for example, in U.S. Pat. Nos. 5,238,733; 5,601,851; or PCT Publication No. WO 97/2375. Multilayered and sheath-core melt blown fibers are described, for example, in U.S. Pat. No. 5,238,733, the substance of which is incorporate herein by reference in its entirety.

The optional backing layer 16 may also be comprised of foam. Potentially useful polymeric backing materials are disclosed in U.S. Pat. No. 5,516,581 (Kreckel et al.) and PCT Publication No. WO 95/06691. Representative examples of potentially useful polymeric backing materials for polymeric foam layers or polymeric film layers include, but are not limited to, polyurethanes; polyesters, e.g., polyethylene terephthalate (PET); polyolefins, e.g., polyethylene, including high density polyethylene, low density polyethylene, linear low density polyethylene, and linear ultra low density polyethylene, polypropylene, polybutylenes, or combinations thereof (e.g., a polyethylene blend); vinyl copolymers, e.g., polyvinyl chlorides, both plasticized and unplasticized, polyvinyl acetates, or combinations thereof, polyimides; polyamides; polystyrenes; cellulose acetate; olefin copolymers, e.g., ethylene/methacrylate copolymers, ethylene/vinylacetate copolymers, acrylonitrile-butadiene-styrene copolymers, ethylene/propylene copolymers, or combinations thereof, acrylic polymers and copolymers; and combinations thereof mixtures or blends of any plastic or plastic and elastomer materials, such as polypropylene/polyethylene, polyurethane/polyolefin, polyurethane/polycarbonate, and polyurethane/polyester, can also be used. Suitable films can also include metallic foils.

Films may be used to increase load bearing strength and rupture strength of the adhesive article. Films are particularly well suited to applications involving adhering smooth surfaces together. A film backing, or layer thereof, can have a thickness of about 10 micrometers (0.4 mil) to about 254 micrometers (10 mils). Films can be continuous or perforated.

The backing layer 16 can be translucent or transparent polymeric elastic films, and can include, but is not limited to: films formed of elastomeric polyurethanes, co-polyesters, polyethylenes, or combinations thereof. In one embodiment, the backing layer has high moisture vapor permeability, but is generally impermeable to liquid water so that microbes and other contaminants are sealed out from the area under the substrate. One example of a suitable material is a high moisture vapor permeable film such as described in U.S. Pat. Nos. 3,645,835 and 4,595,001, the disclosures of which are herein incorporated by reference. In high moisture vapor permeable film/adhesive composites, the composite should transmit moisture vapor at a rate equal to or greater than human skin such as, for example, at a rate of at least 300 $g/m^2/24$ hrs at 37° C./100-10% RH, or at least 700 $g/m^2/24$ hrs at 37° C./100-10% RH, or at least 2000 $g/m^2/24$ hrs at 37° C./100-10% RH using the inverted cup method as described in U.S. Pat. No. 4,595,001. Perforated substrates or films or pattern coated adhesives may be used to increase the moisture vapor transmission. In one embodiment, the substrate is an elastomeric polyurethane, polyester, or polyether block amide films. These films combine the desirable properties of resiliency, elasticity, high moisture vapor permeability, and transparency. A description of this characteristic of backing layers can be found in issued U.S. Pat. Nos. 5,088,483 and 5,160,315, the disclosures of which are hereby incorporated by reference Commercially available examples of potentially suitable backing layer materials may include the thin polymeric film backings sold under the trade names TEGADERM (3M Company), OPSITE (Smith & Nephew), etc. Many other backing layers may also be used, including those commonly used in the manufacture of surgical incise drapes (e.g., incise drapes manufactured by 3M Company under the trade names STERIDRAPE and IOBAN), etc.

Regardless, however, it may be desirable that the backing layer 16 be kept relatively thin to, e.g., improve conformability. For example, the backing layer may be formed of polymeric films with a thickness of 200 micrometers or less, or 100 micrometers or less, potentially 50 micrometers or less, or even 25 micrometers or less.

Figure 3:
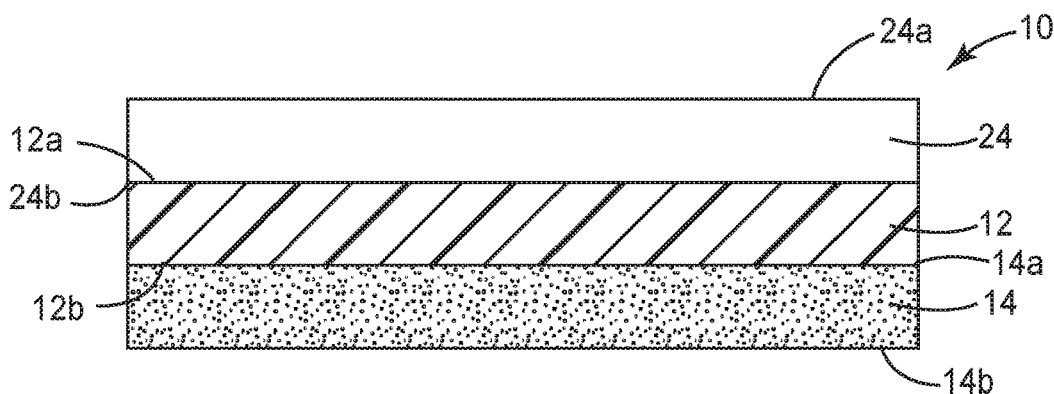
FIG. 3 is a schematic side view of a second embodiment of an adhesive article of the present invention.
Figure 4:
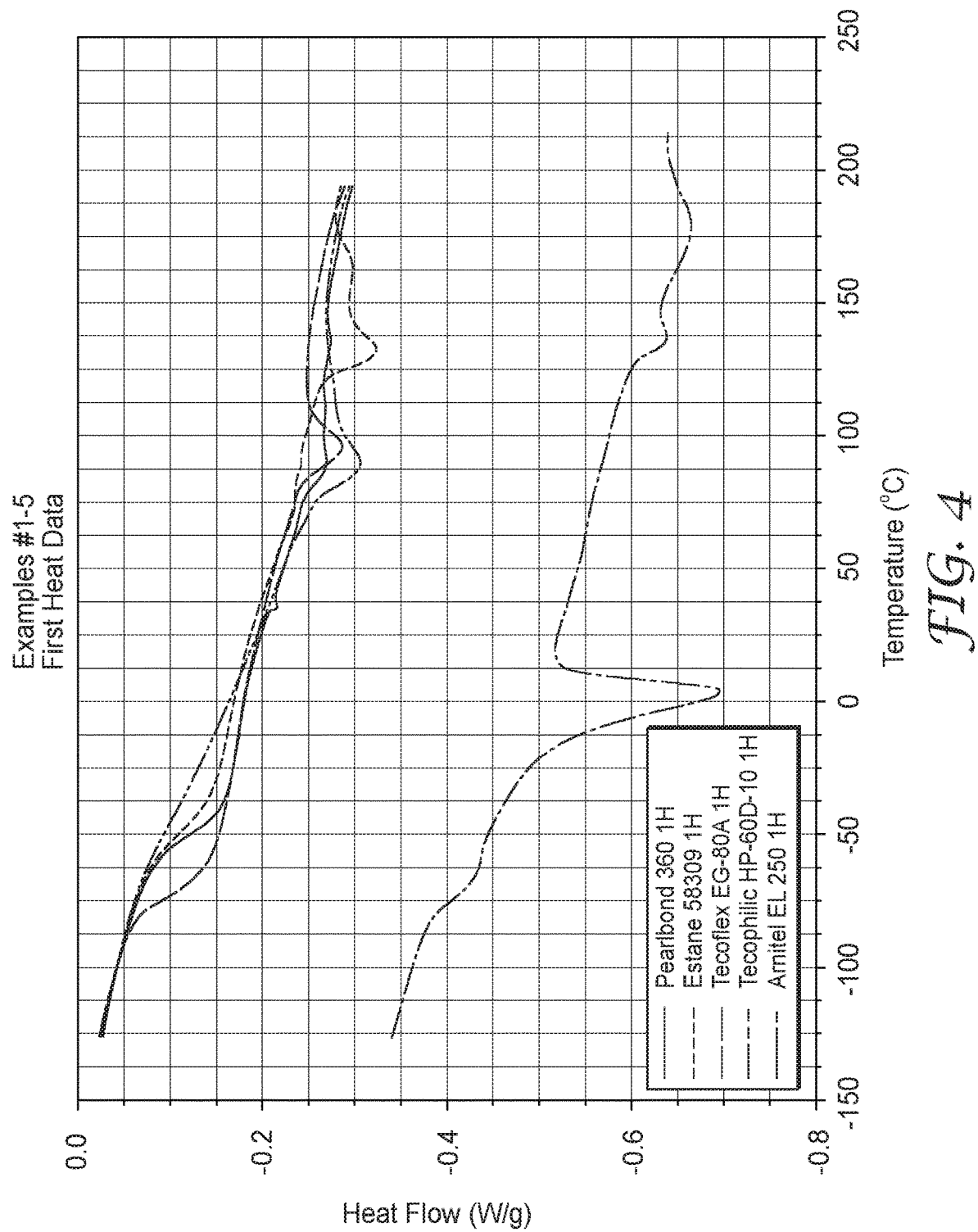
FIG. 4 is a plot showing heat flow versus temperature of tie layers of the present invention.
Figure 5:
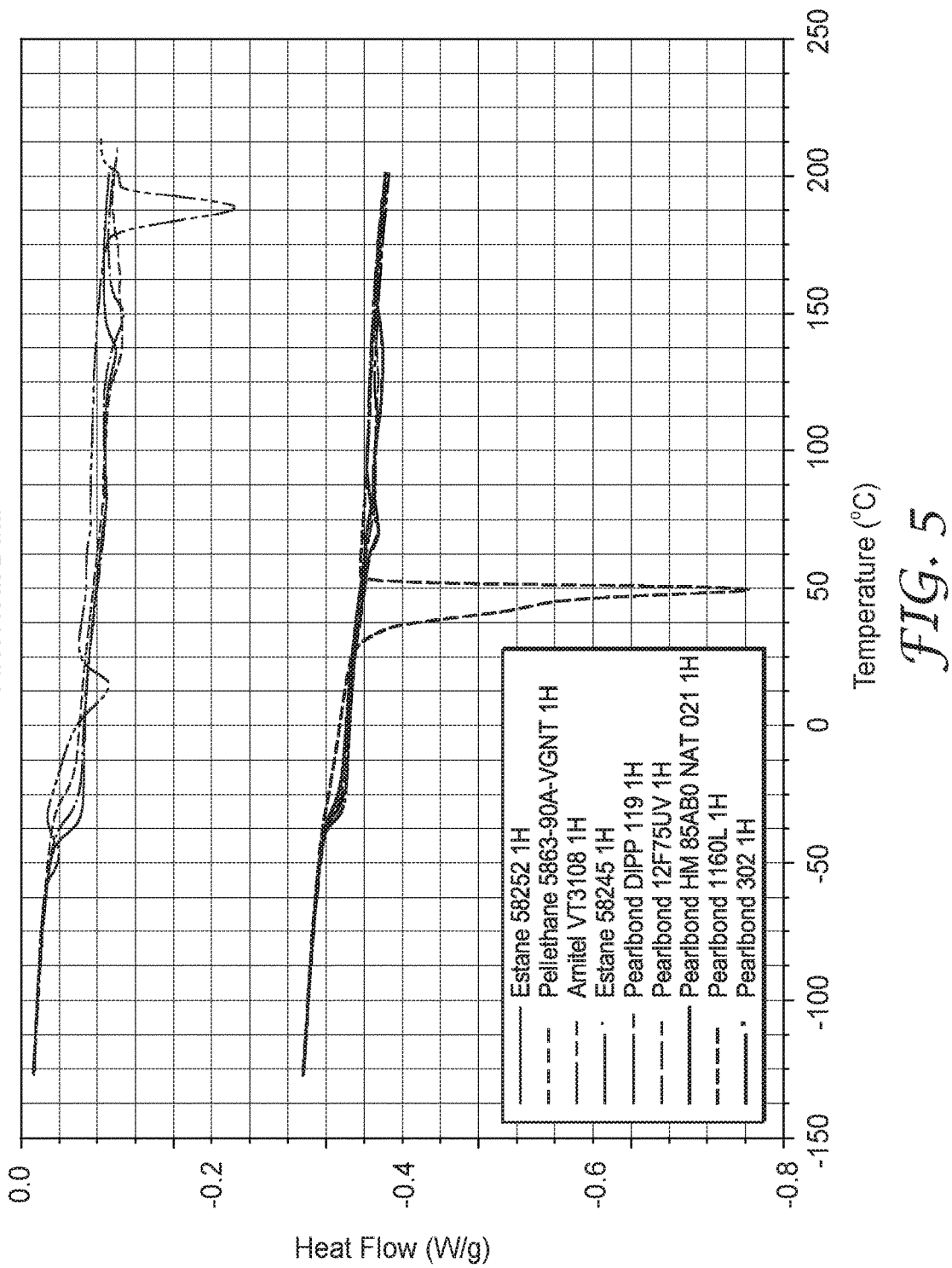
FIG. 5 is a plot showing heat flow versus temperature of tie layers of Comparative Examples.

Although the adhesive article 10 has been described as including a backing layer that is separate from the tie layer, in some embodiments, the tie layer 12 may also function as a backing layer with the adhesive layer including only the tie layer and the silicone adhesive. FIG. 3 shows an embodiment in which the adhesive article does not include a backing layer.

Additional Layers

As shown in FIGS. 1 and 3, the adhesive article 10 may include a low adhesion backsize (LAB) coating 24. In embodiments in which the adhesive article is provided in roll form, the LAB coating 24 can be configured to provide release characteristics to the silicone adhesive 14 such that the adhesive article can be directly rolled upon itself without the use of a release liner. Alternatively, or additionally, the adhesive article can include a release liner over the silicone adhesive that provides sufficient release characteristics to the silicone adhesive. When utilized, the LAB coating composition should be compatible with the silicone adhesive composition and not degrade the adhesive properties of the adhesive article, such as by being transferred to the silicone adhesive composition.

LAB coating compositions may include, but are not limited to: silicone, alkyl, or fluorochemical constituents, or combinations thereof, as the release imparting component. Useful LAB coating compositions include, but are not limited to: silicone containing polymers, silicone macromers, such as those described in WO2012091742, and silicone polyurethanes, silicone polyureas and silicone polyurethane/ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202,190, and 4,728,571. Other useful LAB coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate) such as those described in U.S. Pat. Nos. 3,502,497 and 4,241,198, where the alkyl side chain includes from about 16 to 22 carbon atoms.

When used as part of a medical article, the adhesive article 10 may also include an absorbent material 20 positioned adjacent the silicone adhesive to contact and protect a wound. The absorbent material 20 may be any absorbent material known to those of skill in the art. For example, the absorbent material can be manufactured of any of a variety of materials including, but not limited to: woven or nonwoven cotton, polyethylene, rayon, gauze, or foam. The absorbent material can also contain a number of substances, optionally including antimicrobial agents, drugs for transdermal drug delivery, chemical indicators to monitor hormones or other substances in a patient, etc.

The absorbent material 20 may include a hydrocolloid composition, including the hydrocolloid compositions described in U.S. Pat. Nos. 5,622,711 and 5,633,010, the disclosures of which are hereby incorporated by reference. The hydrocolloid absorbent may comprise, for example, a natural hydrocolloid, such as pectin, gelatin, or carboxymethylcellulose (CMC) (Aqualon Corp., Wilmington, Del.), a semi-synthetic hydrocolloid, such as cross-linked carboxymethylcellulose (X4ink CMC) (e.g., Ac-Di-Sol; FMC Corp., Philadelphia, Pa.), a synthetic hydrocolloid, such as cross-linked polyacrylic acid (PAA) (e.g., CARBOPOL™ No. 974P; B.F. Goodrich, Brecksville, Ohio), or a combination thereof. Absorbent materials may also be chosen from other synthetic and natural hydrophilic materials including polymer gels and foams.

In one embodiment, the adhesive article may include a release liner 22 that covers all or a portion of the silicone adhesive to prevent contamination of the silicone adhesive. In one embodiment, the package that contains the adhesive article may serve as a release liner. The release liner 22 can be any release liner known to those of skill in the art. Examples of suitable release liners can be made of kraft papers, polyethylene, polypropylene, polyester or composites of any of these materials. In one embodiment, the liners are coated with release agents such as silicones. For example, the release liner 22 may be constructed of a solvent-coated release layer on a plastic, paper, or foil liner. Other release materials that can be used as release layers with a liner include silicones, polyurethanes, and the like. In one embodiment, the liners are papers, polyolefin films, or polyester films coated with silicone release materials.

Methods of Making the Adhesive Article

To construct the adhesive article 10 of the present invention, the resin composing the tie layer 12 is first dried, extruded, and collected in a roll format. When a backing layer 16 is part of the adhesive article 10, the resin is extruded onto the backing layer 16. When making the tie layer 12, the processing temperatures are adjusted to meet the requirements of each resin comprising the tie layer 12 to ensure that the resin can be processed. Additionally, depending on the viscosity of the polymer melt, the screw revolutions per minute can be adjusted to ensure a target basis weight is achieved. The back-up roll is heated and a corona treatment (e.g., 0.20 kW) is applied to the surface of the backing right before the comprising the tie layer is extruded to help promote bonding between the backing and the extruded film. In addition to extrusion, the resin can also be coated out of solvent or water-based emulsion or suspension.

In one embodiment, the tie layer film is extruded at a thickness of least about 0.5 mil, with a thickness ranging from about 0.5 to about 4 mil, particularly about 0.5 to about 2 mil, more particularly about 0.8 to about 1.0 mil, depending on not only the viscosity of the melt.

The silicone adhesive 14 is then coated onto the tie layer 12 on a surface opposite the backing layer 16 and cured. The silicone adhesive 14 may be cured by any means known to those of skill in the art, including thermal and photo curing. In one embodiment, the silicone adhesive 14 is cured using electron beam radiation. When used as part of a tape construction, the product can be wound onto itself or optionally have an included release liner 22. When used as part of a medical article, such as a bandage construction, an absorbent material 20 can be positioned adjacent a portion of the silicone adhesive 14. A release liner 22 may then be positioned over the silicone adhesive 14 and the absorbent material 20 to protect from the environment until the adhesive article 10 is ready for use. In some embodiments, the adhesive article 10 does not include a release liner 22 and is self-wound, and the opposite, exposed surface of the silicone adhesive 14 will come into contact with the uncoated surface of the backing layer.

While the adhesive article 10 of the present invention has been discussed as being used in a bandage construction, the adhesive article may used in any number of constructions, and particularly medical articles, such as, for example: tapes, wound dressings, surgical drapes, IV site dressings, a prosthesis, an ostomy or stoma pouch, a buccal patch or a transdermal patch.

EXAMPLES

These examples are merely for illustrative purposes only and are not meant to be limiting on the scope of the appended claims. All parts, percentages, ratios, etc. in the examples and the rest of the specification are by weight, unless noted otherwise. Materials used in the Examples and their sources are provided in Table 1. Solvents and other reagents used were obtained from Sigma-Aldrich Chemical Company, St. Louis, MO, US unless otherwise noted.

TABLE 1

| Material | Description | Supplier/Source |
|---|---|---|
| ESTANE 58245 | Aromatic polyether thermoplastic polyurethane (TPU), Shore A hardness of 80. | Lubrizol Corp. (Wickliffe, OH) |
| ESTANE 58252 | Polyether TPU, Shore A hardness of 70. | Lubrizol Corp. (Wickliffe, OH) |
| ESTANE 58309 | Polyether TPU, Shore A hardness of 85. | Lubrizol Corp. (Wickliffe, OH) |
| PELLETHANE-5863-90A | Aromatic polyether TPU, Shore A hardness of 90. | Lubrizol Corp. (Wickliffe, OH) |
| PEARLBOND DIPP 119 | Polycaprolactone-copolyester TPU, Shore A hardness of 70. | Lubrizol Corp. (Wickliffe, OH) |
| PEARLBOND HM85ABONAT-021 | Polyester-based TPU. | Lubrizol Corp. (Wickliffe, OH) |
| PEARLBOND 302 | Aromatic polyester-based TPU, Shore A hardness of 55. | Lubrizol Corp. (Wickliffe, OH) |
| PEARLBOND 12F75UV | Polyester-based TPU, Shore A hardness of 78. | Lubrizol Corp. (Wickliffe, OH) |
| PEARLBOND 1160L | Linear aromatic polyurethane, Shore A hardness of 90. | Lubrizol Corp. (Wickliffe, OH) |
| PEARLBOND 360 | Polyether-based TPU, Shore A hardness of 68. | Lubrizol Corp. (Wickliffe, OH) |
| TECOPHILIC HP-60D-10 | Aliphatic, hydrophilic polyether-based resin thermoplastic polyurethane | Lubrizol Corp. (Wickliffe, OH) |
| TECOFLEX EG-80A | Aliphatic polyether-based TPU, Shore A hardness of 72. | Lubrizol Corp. (Wickliffe, OH) |
| ARNITEL VT3108, TPC-ET | Thermoplastic copolyester, Shore D hardness of 45 | DSM (Heerlen, Netherlands) |
| ARNITEL EL250, TPC-ET | Thermoplastic copolyester, Shore D hardness of 25, Shore A hardness of 85. | DSM (Heerlen, Netherlands) |
| SiPU | Silicone Polyurethane/polyurea in MEK/IPA (1:1) | Prepared as described below |
| Silicone Polyoxamide | 25k silicone polyoxamide | Prepared described in U.S. Pat. No. 7,915,370 for Preparative Example 1 |

TABLE 1-continued

| Material | Description | Supplier/Source |
|---|---|---|
| HOSTAPHAN 3SAB | One-side primed 2 mil polyester film | Mitsubishi Polyester Film, Greer, SC, US |
| X-22-176DX | Silicone Diol | Shin-Etsu Chemical Company, Tokyo, Japan |
| H12MDI | 4,4'-Methylenebis (cyclohexyl) isocyanate, trade designation "DESMODUR W" | Coyestro, Baytown, TX, US |
| JEFFAMINE THF 100 | Polyetheramine, obtained under the trade designation "JEFFAMINE THF 100" from | Huntsman Corporation, The Woodlands, TX, US |
| IPA | Isopropyl alcohol | VWR, Radnor, PA, US |
| MEK | Methyl ethyl ketone | EMD Serono, Billerica, MA, US |
| DBU | 1,8-Diazobicyclo [5.4.0]undec-7-ene | Sigma-Aldrich. St. Louis, MO, US |
| Toluene | Solvent | EMD Millipore Corporation, Billerica, MA, US |

Preparation of Silicone Polyurethane/Polyurea Primer (SiPU)

The silicone polyurethane/polyurea polymer was prepared by combining 20 g of silicone diol X-22-176DX and 125 g of MEK. The material was azeotropically dried by distilling 40 g of MEK. The solution was cooled to 60° C. and 36.8 g of H12MDI and 0.04 g of DBU were added. This solution was stirred at 75° C. for 3 hours and then cooled to 25° C. to provide an isocyanate-terminated prepolymer solution. In a separate reaction vessel, 143.2 g of JEFFAMINE THF 100 and 365 g of IPA were combined. The isocyanate-terminated prepolymer solution was then slowly added to the JEFFAMINE solution, at a rate maintaining a temperature below 3° C. This mixture was stirred at 25° C. for 1 h. The resulting solution was determined to have a 30.5% solids content of silicone polyurethane/polyurea primer in a 1:1 blend of IPA and MEK. This solution was used to prepare Example 7, as described below.

Adhesive Anchorage Test

The adhesive anchorage test measured the strength of the bond between the extruded resin and the cured adhesive. A resin was considered to be a successful tie layer if the bond had sufficient strength so that a significant amount of the adhesive was not removed from the extruded resin. The adhesive anchorage bond strength of the adhesive-extruded film-backing interfaces was tested by laminating a 2 to 4 inch section of 3M Polyester Tape 8403 (1-inch-wide, 3M Company, St. Paul, MN, US) to the crosslinked adhesive surface. The tape was rolled down with 2 passes of a 2 kilogram roller at 12 inches per minute and then allowed to dwell for 15-20 minutes (Day 0 measurements) or for a specified length of time as provided in Table 2. The specimen was mounted by double-coated tape onto the peel tester IMASS SP-2300 (available from IMASS, Inc., Accord, MA, US). The 8403 tape was removed from the test specimen at about 12 inches per minute at 180° peel angle. The average peel force (average of at least 3 measurements) was reported. The percentage adhesive transfer was visually assessed and recorded, which is the percent area of the test specimen having no adhesive left (i.e., not sticky) on the backing. The percentage by area of adhesive remaining on the backing layer is equivalent to 100% minus the percentage adhesive transfer.

Extrusion

All resins were dried at 150° F. under vacuum before extrusion, typically overnight. Resins were extruded onto SONTARA 8010 non-woven backing (Jacob-Holm, Candler, NC, US) using a Haake single screw extruder (Model: TYP 557-0029, Thermo Fisher Scientific, Waltham, MA, US). Example extruder settings for ESTANE 58309 are presented below:

Extruder zone temperatures: 300° F., 315° F., 330° F.
Extrusion Die temperature: 330° F.
Backup roll temperature: 150° F.
Screw rotations per minute (RPM): 77.5 RPM
Line Speed: 25 feet per minute Samples of resin extruded onto SONTARA 8010 backing were made as described above using each of the materials listed in Table 1. The processing temperatures were adjusted to meet the requirements of each resin. For example, most of the PEARLBOND resins required extruder temperatures in the 200-300° F. range, while the PELLETHANE and ARNITEL resins required higher temperatures. Additionally, depending on the viscosity of the polymer melt, the screw RPM was adjusted to ensure a target basis weight of approximately 6.6 grain/4"×6" (1 mil or 25 gsm) was achieved. The back-up roll was heated and a corona treatment (0.20 kW) was applied to the surface of the SONTARA 8010 backing right before resin extrusion to help promote bonding between the non-woven backing and the extruded film.

Tie layer films were extruded at least 0.5 mil (12.7 micrometers (μm)), with preferred thickness of 0.8-1.0 mil (20.32-25.4 μm).

Fabrication of Adhesive-Coated Film Specimens

Adhesive 1: AK 1,000,000 polydimethylsiloxane fluid (80 grams, available from Wacker Chemical Corp., Adrian, MI) and MQ 803 TF Silicone Resin Powder (20 grams, also available from Wacker Chemical Corp.) were added to a cup and blended for 90 seconds at 2500 rpm in a mixer (obtained from FlackTek Inc, Landrum, SC, under the trade designation "SPEEDMIXER MODEL DAC 150.1 FV") to form a homogenous mixture. The mixture was coated at a thickness of 100 μm onto the resin side of the backing. The coating was irradiated with an electron beam (E-beam) dose of 3 MRad.

Adhesive 2: OHX-4070 polydimethylsiloxane fluid (69 grams, available from XIAMETER, Midland, MI) and MQ 803 TF Silicone Resin Powder (31 grams) were added to a cup and blended for 90 seconds at 2500 rpm in a SPEEDMIXER MODEL DAC 150.1 FV mixer to form a homogenous blend. The blend was coated at a thickness of 100 μm onto the resin side of the backing. The coating was irradiated with an E-beam dose of 7 MRad.

Electron Beam Ionization Treatment of Samples

Samples coated with silicone adhesive were exposed to ionizing radiation for crosslinking on an electron beam generating apparatus (obtained from Energy Sciences, Inc., Wilmington, MA, under the trade designation "MODEL CB-300") using methods described in U.S. Pat. No. 8,541, 481. The samples were attached to a polyethylene terephthalate (PET) support film to convey them through the nitrogen inerted irradiation chamber of the electron beam generating apparatus. The samples were exposed to radiant energy as indicated above at 280 kilovolts (kV). Samples were then covered with release liner.

In these electron beam-cured adhesive-coated film specimens, the extruded resin acts as a tie layer between the cured adhesive and the SONTARA 8010 backing. The electron beam-cured adhesive-coated film specimens were tested using the Adhesive anchorage test method within a day after fabrication and then subsequently tested again over time.

Results of the adhesive anchorage testing and visual assessments of the adhesive failure modes are presented in Table 2. The data presented in Table 2 shows the adhesive anchorage data for the different polymer films extruded onto SONTARA 8010 non-woven backing initially and then at least 3 days later. Samples that showed from 60% up to 100% adhesive transfer (from the backing to the test tape 8403) were considered to have an unacceptable adhesive anchorage with the test adhesives (e.g., Comparative Samples 1-9, presented in Table 2). Some samples showed an adhesive anchorage with the test adhesives that became better with time—for example, the amount of adhesive transfer dramatically decreased, or in some cases showed zero adhesive transfer, with just a short aging period (e.g., Examples 1-4). Samples that demonstrated a strong adhesive anchorage with the test adhesives (e.g., Example 5) showed adhesive transfer of 20% or less and/or showed cohesive splitting. Cohesive splitting suggests that the bond to the backing was so strong that the strength of the adhesive to itself failed before the adhesive was removed from the extruded tie layer backing.

|  |  | Adhesive 1 | | | | Adhesive 2 | |
|---|---|---|---|---|---|---|---|
|  |  | Day 0 | | Day 11 (unless noted otherwise) | | Day 0 | |
|  | Resin Type | Average peel force (oz/in) | Adhesive failure mode | Average peel force (oz/in) | Adhesive failure mode | Average peel force (oz/in) | Adhesive failure mode |
| Comp. Example 1 | ESTANE 58252 | 8.4 | 100% adhesive transfer | 10.3 | 100% adhesive transfer | 7.1 | 100% adhesive transfer |
| Comp. Example 2 | PELLETHANE 5863-90A | 6.5 | 100% adhesive transfer | 7.2 | 100% adhesive transfer | 4.3 | 100% adhesive transfer |
| Comp. Example 3 | PEARLBOND DIPP 119 | 4.7 | 100% adhesive transfer | 5.9 | 100% adhesive transfer | 3.3 | 100% adhesive transfer |
| Comp. Example 4 | PEARLBOND HM85ABONA T-021 | 4.6 | 100% adhesive transfer | 6.1 | 100% adhesive transfer | 3.3 | 100% adhesive transfer |
| Comp. Example 5 | PEARLBOND 302 | 7.1 | 100% adhesive transfer | 8.5 | 100% adhesive transfer | 4.1 | 100% adhesive transfer |
| Comp. Example 6 | PEARLBOND 12F75UV | 5.9 | 100% adhesive transfer | 6.7 | 100% adhesive transfer | 3.6 | 100% adhesive transfer |
| Comp. Example 7 | ARNITEL 3108 | 10 | 100% adhesive transfer | 12.6 (3 days later) | 100% adhesive transfer | 11.6 | 80% adhesive transfer |
| Comp. Example 8 | PEARLBOND 1160L | 6.2 | 100% adhesive transfer | 7.2 (7 days later) | 100% adhesive transfer | 4.6 | 100% adhesive transfer |
| Comp. Example 9 | ESTANE 58245 | 7.6 | 90% adhesive transfer | 8.1 | 100% adhesive transfer | 5.6 | 50% adhesive transfer |
| Example 1 | PEARLBOND 360 | 22 | 20% adhesive transfer | 24.2 | 60% adhesive transfer | 13.7 | No adhesive transfer |
|  |  | 22.9 | 30% adhesive transfer | 22.5 (3 days later) | 20% adhesive transfer | 13.4 | 20% adhesive transfer |
| Example 2 | TECOFLEX EG-80A | 23.7 | 60% adhesive transfer | 26.4 | No adhesive transfer | 15.4 | 30% adhesive transfer |
|  |  | 23.6 | No adhesive transfer | 23.7 | No adhesive transfer | 15.7 | 10% adhesive transfer |
| Example 3 | ESTANE 58309 | 17.4 | 100% adhesive transfer | 24.5 | No adhesive transfer | 12.5 | 20% adhesive transfer |
|  |  | 17.6 | 100% adhesive transfer | 23.7 | No adhesive transfer | 13.7 | 30% adhesive transfer |
| Example 4 | TECOPHILIC-HP-60D-10 | 8.4 | 100% adhesive transfer | 20 | No adhesive transfer | 5.7 | 100% adhesive transfer |

|  |  | Adhesive 2 | | | |
|---|---|---|---|---|---|
|  |  | Day 4 | | Day 18 | |
|  | Resin Type | Average peel force (oz/in) | Adhesive failure mode | Average peel force (oz/in) | Adhesive failure mode |
| Comp. Example 1 | ESTANE 58252 | 13.5 | 80% adhesive transfer | 10.9 | 70% adhesive transfer |
| Comp. Example 2 | PELLETHANE 5863-90A | 5.1 | 100% adhesive transfer | 4.8 | 100% adhesive transfer |
| Comp. Example 3 | PEARLBOND DIPP 119 | 3.5 | 100% adhesive transfer | 3.7 | 100% adhesive transfer |
| Comp. Example 4 | PEARLBOND HM85ABONA T-021 | 3.4 | 100% adhesive transfer | 3.8 | 100% adhesive transfer |
| Comp. Example 5 | PEARLBOND 302 | 4.9 | 100% adhesive transfer | 4.2 | 100% adhesive transfer |
| Comp. Example 6 | PEARLBOND 12F75UV | 4 | 100% adhesive transfer | 4.3 | 100% adhesive transfer |
| Comp. Example 7 | ARNITEL 3108 | 12.8 | 10% adhesive transfer |  |  |
| Comp. Example 8 | PEARLBOND 1160L | 5.6 (7 days later) | 100% adhesive transfer |  |  |

-continued

| | | | | | | |
|---|---|---|---|---|---|---|
| Comp. Example 9 | ESTANE 58245 | | 5.7 | 80% adhesive transfer | 5.2 | 50% adhesive transfer |
| Example 1 | PEARLBOND 360 | | 12.6 | 50% adhesive transfer | 14.8 | 10% adhesive transfer |
| | | | 13.2 | 10% adhesive transfer | | |
| Example 2 | TECOFLEX EG-80A | | 14.8 | 20% adhesive transfer | 14 | No adhesive transfer |
| | | | 15.4 | No adhesive transfer | 15.6 | 20% adhesive transfer |
| Example 3 | ESTANE 58309 | | 11.6 | No adhesive transfer | 12 | No adhesive transfer |
| | | | 14.3 | 20% adhesive transfer | 13 | No adhesive transfer |
| Example 4 | TECOPHILIC-HP-60D-10 | | 10.5 | 20% adhesive transfer | 14.1 | No adhesive transfer |

Preparation of Example 6

MG 7-1010 Soft Skin Adhesive Part A (50 grams) and Part B (50 grams) (available from Dow-Corning, Midland, MI, US, currently operating as DowDuPont) were added to a cup and blended for 120 seconds at 1000 rpm in a mixer (obtained from FlackTek Inc, Landrum, SC, US under the trade designation "SPEEDMIXER MODEL DAC 150.1 FV") to form a homogenous mixture. The mixture was coated at a thickness of 100 μm onto SILFLU 1R82001 fluorosilicone-coated PET release liner (available from Siliconature S.p.A., Italy) and cured at 120° C. for 10 minutes. The coated and cured adhesive was laminated to the ARNITEL EL250 extruded onto a 70% PET/30% SPANDEX woven blend. (Xiaoshan Johnson Cloth Company, Zhejiang, China). The sample was tested using the adhesive anchorage test method and results are in Table 3.

TABLE 3

| | | Day 2 | |
|---|---|---|---|
| | Resin Type | Average peel force (oz/in) | Adhesive failure mode |
| Example 6 | Arnitel EL250 | 28.5 | 30% adhesive transfer |

Compositional Analysis of Resins Using NMR

The resins were compositionally analyzed using proton nuclear magnetic resonance spectroscopy ($^1$H-NMR). Results are presented in Table 4, along with bonding acceptability with Adhesive 1, tested according to the adhesive anchorage test method.

TABLE 4

| Resin | Major Components* | Bond with Adhesive 1 |
|---|---|---|
| Estanec 58252 | MDI (30 wt %); BD (5 wt %); PEO polyether polyol (65 wt %) | Failed |
| Pellethane-5863-90A | MDI (42 wt %); BD (9 wt %); PEO (49 wt %) | Failed |
| Pearlbond DIPP 119 | MDI (27 wt %); Polyester polyol comprising PCL (65 wt %), BD (7 wt %), and NPG (0.7 wt %) | Failed |
| Pearlbond HM85 ABONAT-021 | MDI (31 wt %); Polyester polyol comprising AA (39 wt %) and BD (31 wt %) | Failed |
| Pearlbond 302 | MDI (21 wt %); Polyester polyol comprising BD (31 wt %) and AA (45 wt %) terminated with BD | Failed |
| Pearlbond 12F75UV | MDI (28 wt %); Polyester polyol comprising BD (30.1 wt %), AA (41 wt %), and NPG (1 wt %) | Failed |
| Arnitel vt 3108 | TP (33.8 wt %)/Isophthalate (5.9 wt %) copolyester; BD (26 wt %); PEO (34.24 wt %) | Failed |
| Pearlbond 1160L | MDI (13 wt %); Polyester polyol consisting of AA (47 wt %), HD (39 wt %), and BD (1.5 wt %) | Failed |
| Estane 58245 | MDI (36 wt %); BD (7 wt %); PEO polyether polyol (57 wt %) | Failed |
| Pearlbond 360 | PTMO (66 wt %); BD (3 wt %); MDI (30 wt %) | Acceptable (bond strength increases with time) |
| Tecoflex EG-80A | PTMO (71 wt %); H12-MDI (28 wt %) | Acceptable (bond strength increases with time) |
| Estane 58309 | MDI (34 wt %); BD (5 wt %); PTMO (60 wt %) | Acceptable (bond strength increases with time) |
| Tecophilic HP-60D-10 | PEO (15 wt %); PTMO (43 wt %); H12-MDI (41 wt %) | Acceptable (bond strength increases with time) |
| Arnitel EL250 | TP (19.9 wt %); BD (9.8 wt %); PTMO (70.3 wt %) | Acceptable (good initial, aged bond strength) |

*MDI = 4,4'-methylene diphenyl diisocyanate;
BD = 1,4-butanediol;
PEO = polyethylene oxide;
PCL = polycaprolactone;
NPG = neopentylglycol;
AA = adipic acid;
TP = terephthalate;
PTMO = polytetramethlene oxide;
PPO = polypropylene oxide;
H12-MDI = 4,4'-methylene dicyclohexyl diisocyanate From the $^1$H-NMR analysis, the composition of each polymer was determined. As can be seen, the more PEO in the resin (particularly greater than >30%), the more likely it was to fail the adhesive anchorage test. Another observation was that polyether-based polyurethane resins (e.g., a resin comprised MDI, PTMO, BD) generally showed an improved bond with the test adhesive overtime. Constructions containing these resins generally performed better in the adhesive anchorage test when several days elapsed between test specimen fabrication and testing. Additionally, polyether-based polyesters with terephthalate generally provided acceptable adhesive anchorage test results with the exception of ARNITEL VT3108, which contains higher amount of PEO (34.24 wt %). Polyester-based polyurethanes all failed the adhesive anchorage testing.

Water Absorbency

The water absorbency of each resin was also measured, using the test method provided below.
1) 5 grams of each resin were measured
2) Resin was placed inside filter paper
3) The bundle was sealed with a twist tie
4) Bundle was weighed again
5) Bundle was submerged in water for 24 hours
6) Bundle was removed and shaken slightly to remove excess water. Remaining visible water was carefully blotted off.
7) Bundle weight was collected and recorded
8) The percentage change was calculated determine amount of water absorbed Results are presented below in Table 5. As can be seen, test specimens made with resins that showed high rates of water absorbency (i.e., greater than 30 wt % water absorbency) had poor adhesive anchorage.

TABLE 5

| Resin | Water Absorbency (weight gain %) |
|---|---|
| Estane 58252 | 85 |
| Pellethane-5863-90A | 32 |
| Pearlbond DIPP 119 | 0 |
| Pearlbond HM85ABONAT-021 | 1 |
| Pearlbond 302 | 1 |
| Pearlbond 12F75UV | 1 |
| Arnitel VT3108 | 31 |
| Pearlbond 1160L | Not tested |
| Estane 58245 | 58 |
| Pearlbond 360 | 2 |
| Tecoflex EG-80A | 1 |
| Estane 58309 | 0 |
| Tecophilic HP 60D-10 | 5 |
| Arnitel EL250 | 1 |

Thermal Analysis

Differential Scanning Calorimetry (DSC) was performed on each resin. The specimens were prepared for DSC analysis by weighing and loading the materials into TA Instruments aluminum DSC sample pans. The specimens were analyzed using the TA Instruments Discovery 2500 Differential Scanning Calorimeter (DSC2A-00886/LN2P cooling) utilizing a heat-cool-heat method in standard mode. (Method: Heat-cool-heat analysis between −130° C. to 270° C. at 10° C./min. The maximum DSC test temperature was chosen based on sample thermal stability).

After data collection, the thermal transitions were analyzed using the TA Universal Analysis program. If present, any glass transitions ($T_g$) or significant endothermic or exothermic peaks were evaluated. The glass transition temperatures were evaluated using the step change in the standard heat flow (HF) curves. The onset, midpoint (half height), and end temperatures of the transition were noted as well as the change in heat capacity observed at the glass transition. Any peak transitions were evaluated including the peak area values and/or peak minimum/maximum temperatures are also determined; peak integration results are normalized for sample weight and reported in J/g. In the case where multiple peak minima or maxima were observed in an endotherm, the extrapolated onset temperature of endotherm was frequently observed well within the central endotherm peak temperature range as opposed to reflecting the beginning of endotherm during heating. In order to consistently compare the samples, an additional endotherm feature evaluation was completed. An initial endotherm onset and partial peak area was evaluated by calculating a peak area and onset temperature between the same starting temperature utilized to evaluate the full endothermic peak but with the evaluation endpoint at 25° C. Splitting and analyzing the initial region of the endothermic peak in this manner provides both: 1) an onset temperature and 2) the fractional heat flow behavior of the materials between the onset of endotherm and 25° C., i.e., room temperature.

This analysis approach as applied to the materials studied, and the DSC results are presented in Table 6 as the temperature span observed between the glass transition ($T_g$) temperature taken as the midpoint (½ height) of the step transition and the onset temperature of first endotherm above $T_g$ (described above) [$T_{endotherm}$-Tg (° C.)] from the first heat data. The onset temperature of first endotherm above $T_g$ ($T_{endotherm}$) is taken as the start of the endothermic feature in the first heat/as received sample data. $T_g$ is defined as the glass transition midpoint temperature.

TABLE 6

| Resin (as received) | [$T_{endotherm}$-$T_g$ (° C.)] | Polyester or Polyurethane |
|---|---|---|
| Estane 58252 | 52 | Polyurethane (polyether soft segment) |
| Pellethane 90A | 41 | Polyurethane (polyether soft segment) |
| Arnitel 3108 | 53 | Polyester |
| Estane 58245 | 60 | Polyurethane (polyether soft segment) |
| PB DIPP 119 | 48 | Polyurethane (polyether soft segment) |
| PB 12F75UV | 49 | Polyester |
| PB HM85ABONAT-021 | 49 | Polyurethane (polyether soft segment) |
| PB 1160L | 51 | Polyester |
| Pearlbond 302 | 51 | Polyurethane (polyether soft segment) |
| PB 360 | 82 | Polyurethane (polyether soft segment) |
| Tecoflex EG-80A | 85 | Polyurethane (polyether soft segment) |
| Estane 58309 | 64 | Polyurethane (polyether soft segment) |
| Tecoflex 60D-10 | 62 | Polyurethane (polyether soft segment) |
| Arnitel EL250 | 62 | Polyester |

Adhesive Shear Test

The adhesive shear test was performed to distinguish between comparative samples having low adhesive transfer and low average peel force from illustrative examples having low adhesive transfer and high average peel force. A circular sample of 12.7 mm diameter was cut with a die. The release liner was removed and the sample was weighed. The sample was placed on a pressure mat (TACTILUS Contact Surface Pressure Mapping, available from Sensor Products Inc., Madison, NJ, US) with the adhesive facing up. The sample was grasped with one finger on the adhesive and one finger on the other side of the pressure mat. The adhesive was rubbed 30 times with the finger, until the pressure exceeded 258 mmHg. The sample was turned every 5 rubs to ensure the whole area of the sample was tested. The sample was weighed again and a percent weight loss was calculated.

Table 7 summarizes results from the adhesive anchorage test and the adhesive shear test for Example 5 compared to commercially available materials Silicone Soft (Comparative Example 10, available from HANSAPLAST, Hamburg, Germany) and EQUATE Sensitive Skin Flexible Fabric Bandages (Comparative Example 11, available from Walmart, Bentonville, AR, US). The results in Table 7 demonstrate that although Comparative Examples 10 and 11 exhibit no adhesive transfer during the adhesive anchorage test, they exhibit a low peel force and have adhesive removed during the shear test. Comparative Example 10 in particular shows particularly high weight loss in the shear test. Example 5, however, demonstrates no adhesive transfer, high peel force and has a small amount of adhesive removed during shear testing. In this way, all three test results are critical (peel test, adhesive anchorage test, and shear test) to consider when developing new silicone adhesive constructions. Passing the adhesive transfer test and showing low amounts of adhesive transfer are not sufficient to have good adhesion to a skin substrate; peel adhesion must also be high, typically greater than approximately 10 oz/in.

TABLE 7

| | Description | Average peel force (oz/in) | Adhesive failure mode | Shear Test - % Weight Loss |
|---|---|---|---|---|
| Comparative Example 10 | HANSAPLAST Silicone Soft | 4.8 | No adhesive transfer | 52% |
| Comparative Example 11 | EQUATE Sensitive Skin Flexible Fabric Bandages | 5.9 | No adhesive transfer | 29% |
| Example 5 | ARNITEL EL250 (adhesive 1) | 26.6 | No adhesive transfer | 25% |

Preparation of Examples 7 and 8

Examples 7 and 8 each included tie layers that contained a segmented copolymer having a polysiloxane first segment. Silicone polyoxamide pellets were dissolved in toluene/IPA (70/30) at 30% solids. The solutions of silicone polyoxamide and SiPU were coated on 3SAB and dried in an oven at 70° C. for 20 minutes to make a 50 micrometer thick film. Adhesive coating and electron beam ionization of these samples were performed as described above. Adhesive anchorage test was performed 5 days after the samples were made, and the results are presented in Table 8. The results in Table 8 demonstrate that Examples 7 and 8 exhibit high peel force and no adhesive transfer.

TABLE 8

| | | Adhesive 1 | | Adhesive 2 | |
|---|---|---|---|---|---|
| | Resin Type | Average peel force (oz/in) | Adhesive failure mode | Average peel force (oz/in) | Adhesive failure mode |
| Example 7 | SiPU | 20.5 | No adhesive transfer | 4.3 | No adhesive transfer |
| Example 8 | Silicone Polyoxamide | 16.0 | No adhesive transfer | 10.5 | No adhesive transfer |

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. An adhesive article comprising:
a tie layer; and
a silicone adhesive,
wherein the tie layer comprises a segmented copolymer having a first segment that is a polyether comprising poly(tetramethylene oxide) (PTMO) and a second segment comprising a polyester, and wherein the segmented copolymer has a water absorbency of less than about 13%.

2. The adhesive article of claim 1, further comprising a backing layer positioned adjacent the tie layer.

3. The adhesive article of claim 1, further comprising a low adhesion backsize.

4. The adhesive article of claim 1, further comprising an absorbent material positioned adjacent the silicone adhesive.

5. The adhesive article of claim 1, further comprising a release liner positioned adjacent the silicone adhesive.

6. An adhesive article comprising:
a silicone adhesive; and
a tie layer;
wherein the tie layer comprises a segmented copolymer having a first segment that is a polyether comprising poly(tetramethylene oxide) (PTMO) and a second segment comprising a polyester,
wherein the tie layer comprises a segmented copolymer having a $T_{endotherm}-T_g$ of at least about 52° C., and
wherein the segmented copolymer comprises less than about 30% polyethylene oxide (PEO).

7. The adhesive article of claim 6, further comprising a backing layer positioned adjacent the tie layer.

8. The adhesive article of claim 6, wherein the tie layer comprises a segmented copolymer having a $T_{endotherm}-T_g$ of at least about 55° C.

9. The adhesive article of claim 6, wherein the tie layer comprises a segmented copolymer having a $T_{endotherm}-T_g$ of at least about 60° C.

10. The adhesive article of claim 6, wherein the tie layer comprises less than about 25% PEO.

11. The adhesive article of claim 6, wherein the tie layer comprises less than about 20% PEO.

12. The adhesive article of claim 6, wherein the tie layer has a water absorbency of less than about 13%.

* * * * *